United States Patent
Ragland (10) Patent No.: US 6,839,793 B2
(45) Date of Patent: Jan. 4, 2005

(54) METHOD AND APPARATUS TO MAXIMIZE BANDWIDTH AVAILABILITY TO USB DEVICES

(75) Inventor: Daniel J. Ragland, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 519 days.

(21) Appl. No.: 09/821,515

(22) Filed: Mar. 28, 2001

(65) Prior Publication Data

US 2002/0144033 A1 Oct. 3, 2002

(51) Int. Cl.[7] .............................................. G06F 13/00
(52) U.S. Cl. ...................................... 710/316; 718/105
(58) Field of Search ........................... 710/63, 100, 117, 710/300, 301, 302, 104, 305–307, 311–313, 316; 709/238, 241, 250; 370/351, 389; 718/105, 104

(56) References Cited

U.S. PATENT DOCUMENTS

| | | | | |
|---|---|---|---|---|
| 4,641,302 A | * | 2/1987 | Miller | 370/422 |
| 5,793,991 A | * | 8/1998 | Mangione-Smith | 709/250 |
| 5,878,232 A | * | 3/1999 | Marimuthu | 709/249 |
| 6,101,550 A | * | 8/2000 | Zucker | 709/241 |
| 6,119,194 A | * | 9/2000 | Miranda et al. | 710/306 |
| 6,199,137 B1 | * | 3/2001 | Aguilar et al. | 710/305 |
| 6,229,811 B1 | * | 5/2001 | Raza et al. | 370/401 |
| 6,256,700 B1 | * | 7/2001 | Sauber | 710/316 |
| 6,263,394 B1 | * | 7/2001 | Inagawa et al. | 710/312 |
| 6,298,370 B1 | * | 10/2001 | Tang et al. | 709/102 |
| 6,324,613 B1 | * | 11/2001 | Aguilar et al. | 710/316 |
| 6,363,077 B1 | * | 3/2002 | Wong et al. | 370/422 |
| 6,389,029 B1 | * | 5/2002 | McAlear | 370/402 |
| 6,407,985 B1 | * | 6/2002 | Jain | 370/256 |
| 6,473,424 B1 | * | 10/2002 | DeJager et al. | 370/389 |
| 6,502,146 B1 | * | 12/2002 | Rasmussen et al. | 710/100 |
| 6,658,512 B1 | * | 12/2003 | Gokulrangan | 710/117 |

FOREIGN PATENT DOCUMENTS

EP   0961443 A1 * 12/1999   ........... H04L/12/56

OTHER PUBLICATIONS

"Universal Serial Bus Specification" Revision 2.0, Chapters 4 and 5, pp. 15–84, Apr. 27, 2000.*

* cited by examiner

Primary Examiner—Xuan M. Thai
(74) Attorney, Agent, or Firm—Blakely, Sokoloff, Taylor & Zafman LLP (57) ABSTRACT

A circuit is presented including switches connected to registers. The registers control the switches. The switches are connected to universal serial bus (USB) ports based on a USB device bandwidth balancing process. Also presented is a method determining allocation of USB root hubs. The method also switching USB root hub USB device assignments.

28 Claims, 7 Drawing Sheets

METHOD AND APPARATUS TO MAXIMIZE BANDWIDTH AVAILABILITY TO USB DEVICES

BACKGROUND OF THE INVENTION

1. Field of the Invention

This invention relates to universal serial bus (USB) use, and more particularly to a method and apparatus of balancing available USB bandwidth for USB devices.

2. Description of the Related Art

In many of todays processing systems, such as personal computer (PC) systems, there exist USB ports for connecting various USB devices. Some of these USB devices are frequently used by PC users. For example, these USB devices may be printers, compact disk read-only-memory (CD-ROM) drives, CD-ROM Writer (CDRW) drives, digital versatile disk (DVD) drives, cameras, pointing devices (e.g., computer mouse), keyboards, joy-sticks, hard-drives, speakers, etc. Some of these devices use more of the available USB bandwidth than others. For example, a USB CDRW is a high bandwidth device, while human interface devices (HID), such as computer mice, keyboards and joysticks, are low bandwidth devices.

Different standards of USB technology have different bandwidths. For example, Universal Serial Bus Specification, revision 1.1, Sep. 23, 1998 (USB 1.1) devices are capable of operating at 12 Mbits/second (Mbps), and Universal Serial Bus Specification, revision 2.0, Apr. 27, 2000 (USB 2.0; also known as high-speed USB) devices are capable of operating at 480 Mbps. Many users of PCs may not understand how to plug in USB devices into the PCs such that two high-bandwidth devices are not sharing the same root hub. When different devices share the same root hub, the devices also must share/split the bandwidth of the USB.

For example, if a user wishes to use a USB CDRW and a USB hard drive, (both are high bandwidth devices) and the user plugs both devices into the USB PC ports that share the same root hub, the hard drive and CDRW, will operate at approximately half of their associated maximum speed capability when simultaneously used. Therefore, assuming both devices are USB 1.1 devices, the throughput is divided in half due to a shared root hub. Thus, the devices may only operate at a rate of 6 Mbps when used simultaneously, instead of the maximum rate of 12 Mbps.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION OF THE INVENTION

The invention generally relates to an apparatus and method to best use the available bandwidth of universal serial bus (USB) devices. Referring to the figures, exemplary embodiments of the invention will now be described. The exemplary embodiments are provided to illustrate the invention and should not be construed as limiting the scope of the invention.

Figure 1:
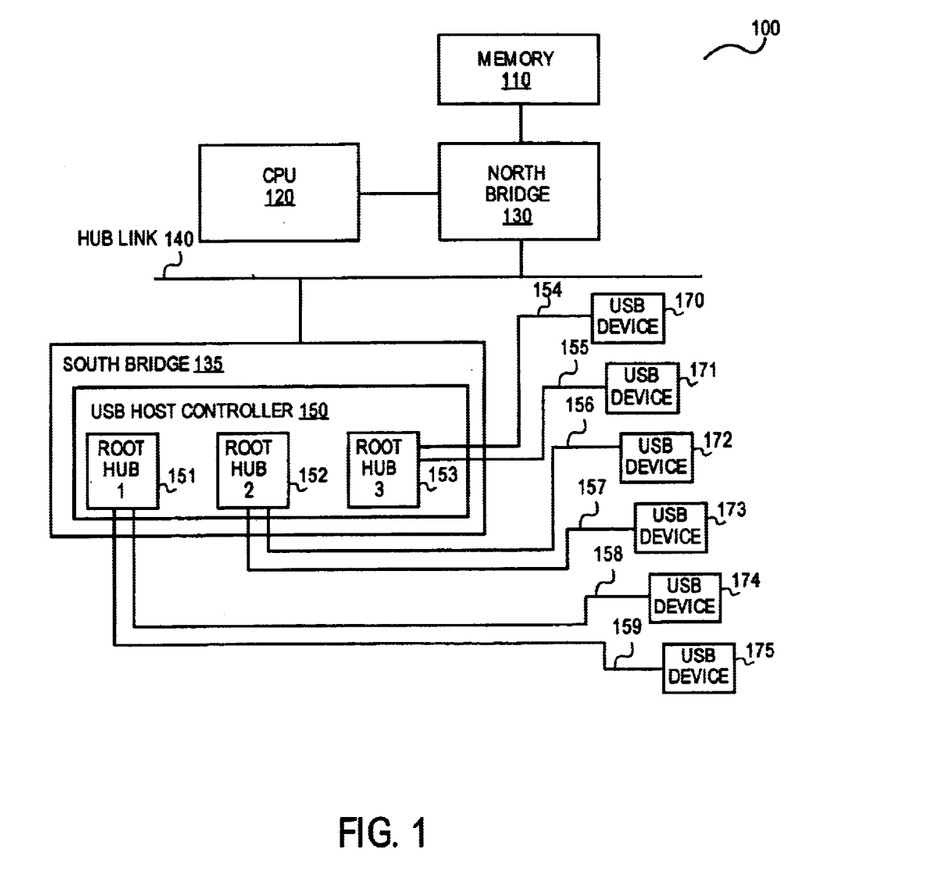
FIG. 1 illustrates a system having a universal serial bus (USB) host controller, USB bus, and USB root hubs.

FIG. 1 illustrates a typical system comprising central processor unit (CPU) 120, memory 110, north bridge 130, hub link 140, and south bridge 135. Typically, the chief responsibility of north bridge 130 is the CPU interface. In addition, north bridge 130 may also have controllers for an accelerated graphics port (AGP), memory 110, and hub link 140, among others. South bridge 135 is typically responsible for a hard drive controller, USB host controller 150, an input/output (I/O) controller, and any integrated sound devices, amongst others.

South bridge 135, as illustrated, is comprised of USB host controller 150 having root hubs 151, 152 and 153. Root hub 151 may be directly coupled to USB devices 174 and 175 via USB bus 158 and 159, respectively. Root hub 152 may be directly coupled to USB devices 172 and 173 via USB buses 156 and 157, respectively. Root hub 153 may be directly coupled to USB devices 170 and 171 via USB buses 154 and 155, respectively.

Figure 2:
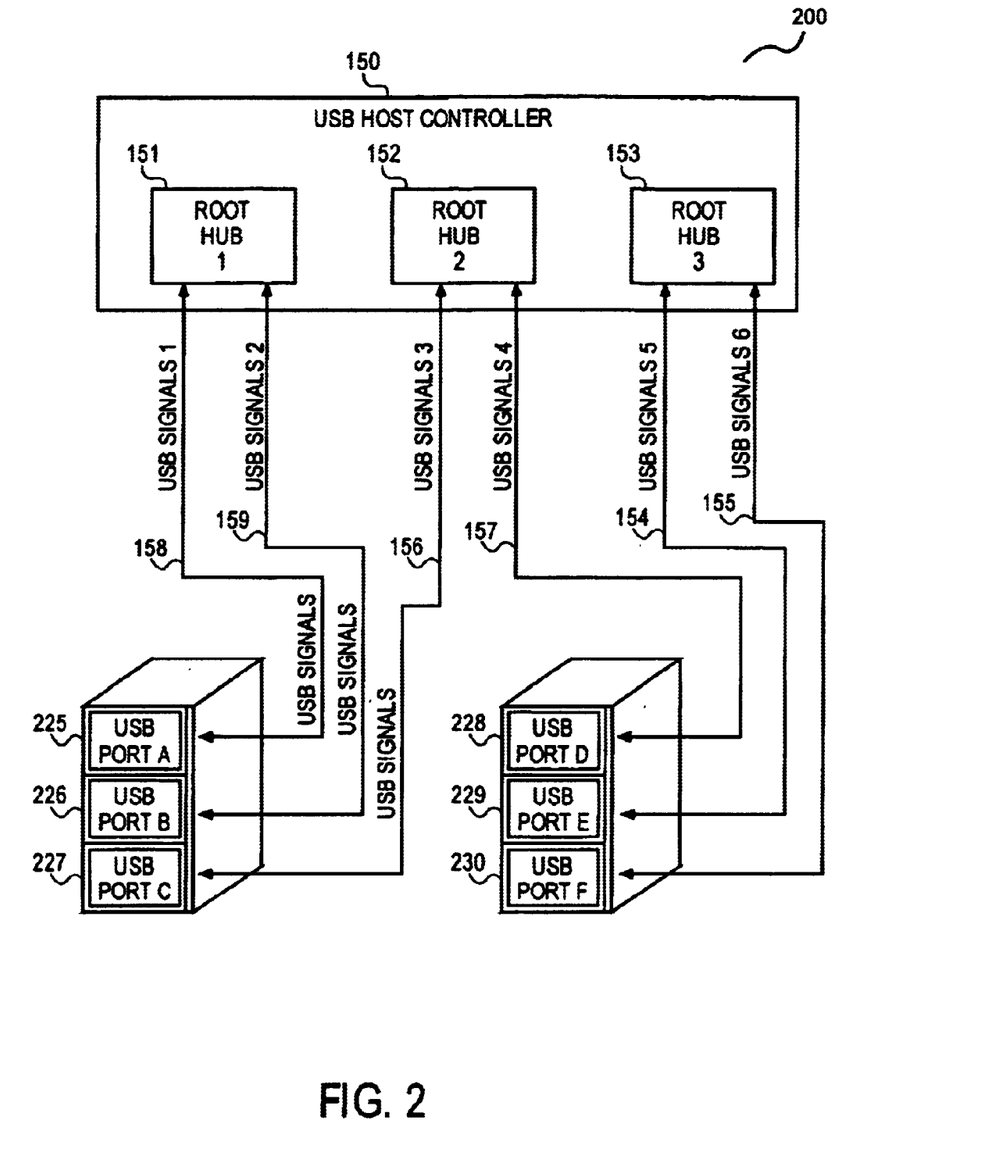
FIG. 2 illustrates a USB host controller coupled with input/output (I/O) connectors for USB devices.

FIG. 2 illustrates USB host controller 150 coupled to USB ports 225–230. USB devices 170–175 can be coupled to USB ports 225–230. It can be seen from FIG. 2 that two devices can be connected to USB ports coupled to the same USB root hub. If two high bandwidth devices are connected to the same hub, the two devices may only operate at half the intended rate. For example, if a high bandwidth device is connected to USB port 225, and another high bandwidth device is connected to USB port 226, then both devices will be connected to USB root hub 151. If USB root hub 151 is using USB 1.1, then the maximum bandwidth is 12 Mbps. If USB root hub 151 is using USB 2.0, then the maximum bandwidth is 480 Mbps. Therefore, both devices connected to USB root hub 151 will share the available bandwidth.

If a user is not sophisticated in USB technology, the user would not know why the two devices seem to be running at a slower pace, than if separately connected to different root hubs. If the user has six USB devices that she wishes to connect to USB ports 225–230, the user would have to know each devices capabilities and be able to determine the most efficient way to connect each device to each port. This is compounded if both USB 1.1 and 2.0 technology is included in the same system. For an average PC user this can be frustrating and time consuming.

Figure 3:
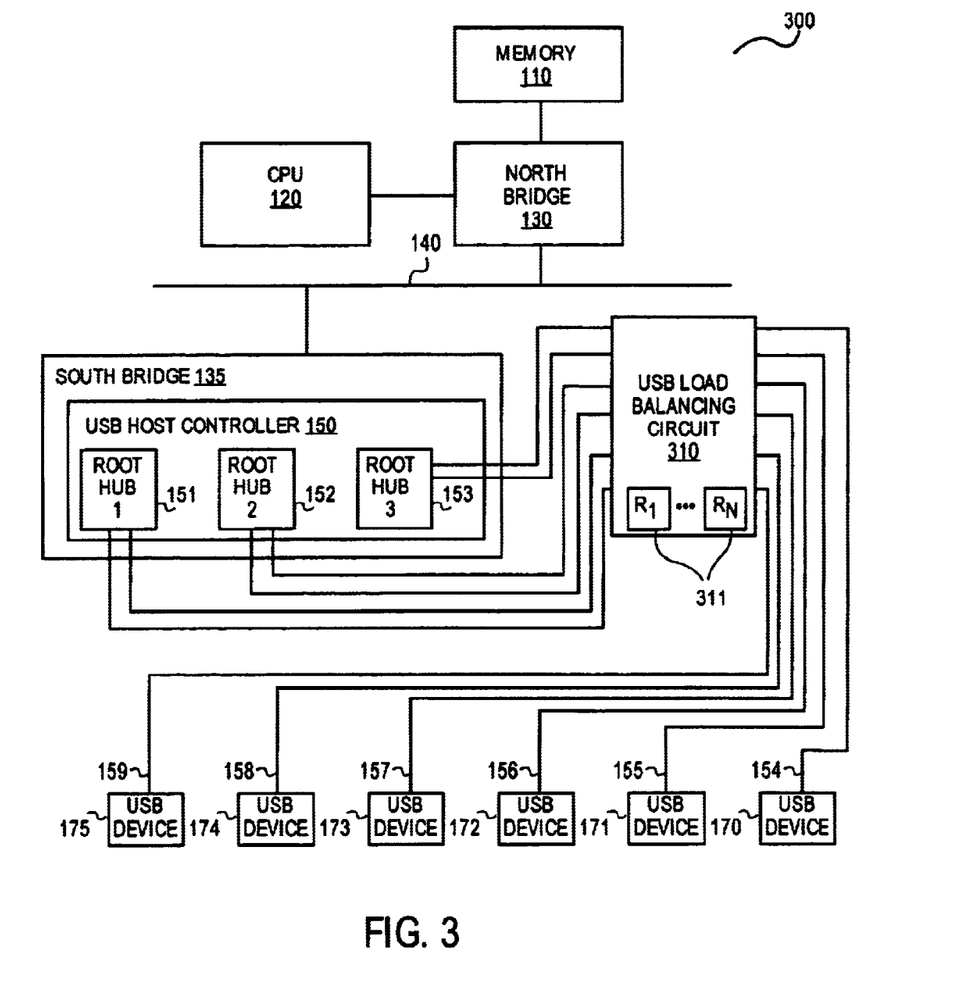
FIG. 3 illustrates a system coupled with an embodiment of the invention having a USB load balancing circuit.

FIG. 3 illustrates a system having am embodiment of the invention. System 300 comprises CPU 120, memory 110, north bridge 130, hub link 140, and south bridge 135. South bridge 135 is comprised of USB host controller 150 having root hubs 151, 152 and 153. In one embodiment of the invention, USB load balancing circuits 310 is disposed between USB host controller 150 and root hubs 151–153. Root hubs 151–153 may be coupled to USB devices 170–175 via signals on USB buses 154–159 via USB load balancing circuit 310. USB load balancing circuit 310 includes a plurality of registers 311 ($R_1$–$R_N$).

Figure 4:
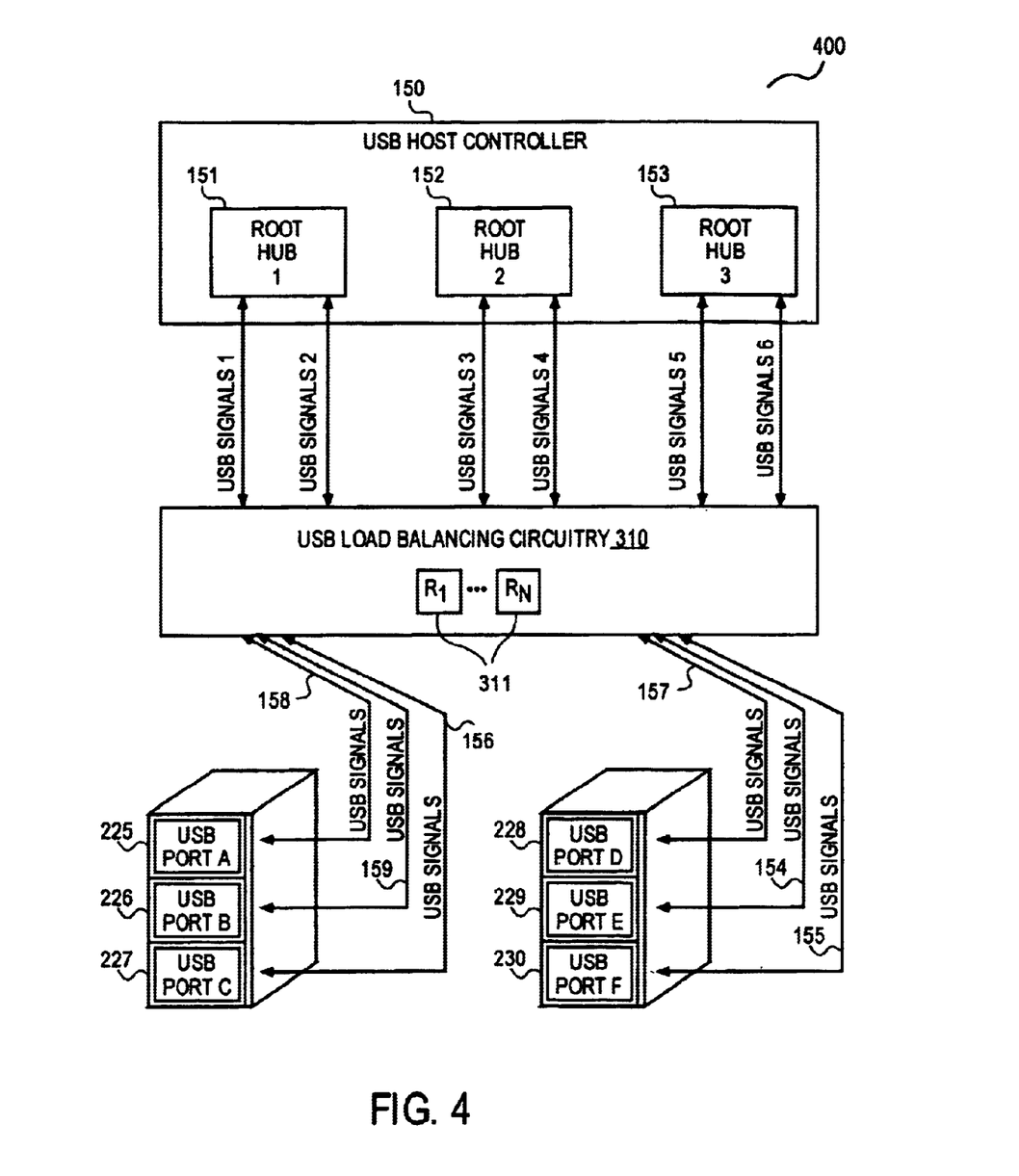
FIG. 4 illustrates an embodiment of the invention coupled between a USB host controller and I/O connectors for USB devices.

FIG. 4 illustrates an embodiment of the invention having USB load balancing circuit 310 coupled with USB ports 225–230. By using USB load balancing circuit 310, USB ports 225–230 are variably connectable to USB root hubs 151–153. When a device is connected to a USB bus, the device is enumerated by the USB subsystem, i.e. a unique device number (e.g., 1–127). The unique number is assigned to the device, then the device descriptor is read by the USB host controller. The USB device descriptor is a data structure that contains information about the device and the device's properties. Each USB device typically only has one device descriptor.

Other descriptors exist such as the configuration descriptor, the interface descriptor, the endpoint descriptor and optional string descriptors. The device descriptor and interface descriptor each contains fields related to device classification. These fields contain the class of the device, sub-class of the device and protocol of the device. These fields are used by a host system to associate a device or interface to a device driver. Some of the device classes are as follows: Display, Communication, Audio, Mass Storage and Human Interface.

Figure 5:
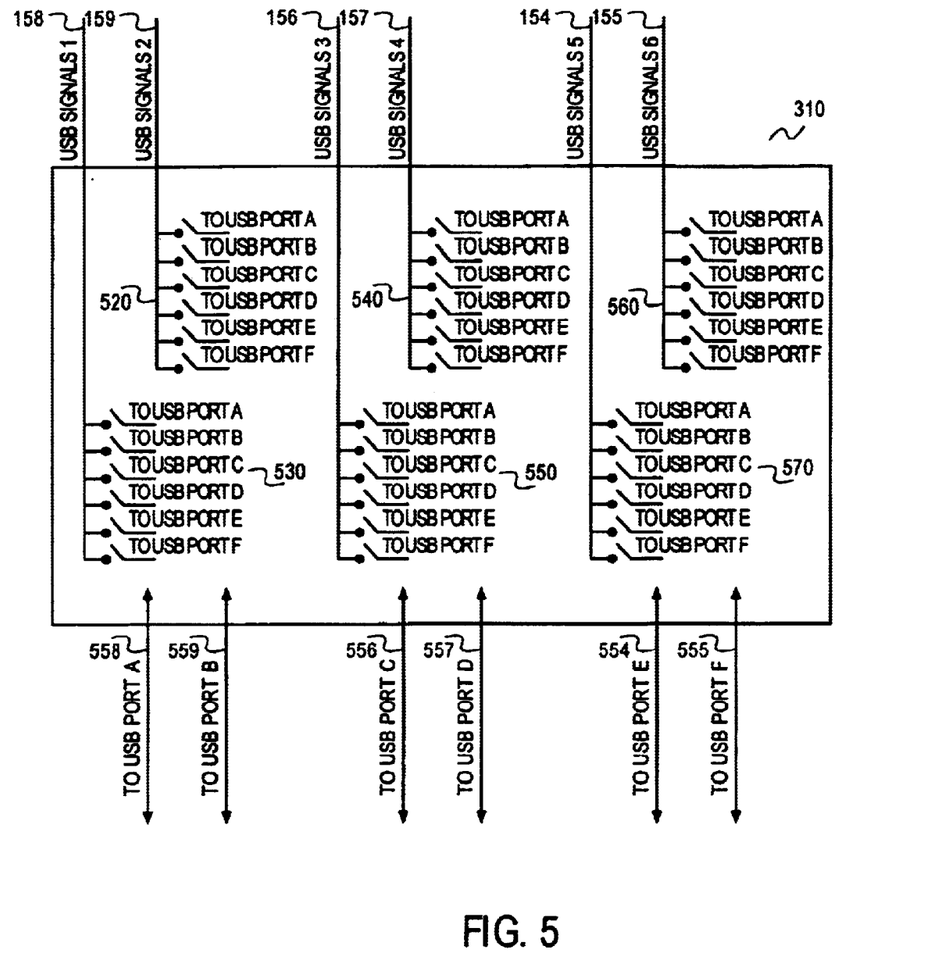
FIG. 5 illustrates an embodiment of the invention.

FIG. 5 illustrates an embodiment of the invention having USB load balancing circuit 310 illustrates in further detail. In one embodiment, USB load balancing circuit 310, comprises switching groups 520, 530, 540, 550, 560 and 570. Switching groups 520, 530, 540, 550, 560 and 570 are controlled by registers 311 in one embodiments of the invention. Registers 311 are software/BIOS controllable in one embodiments of the invention. USB signals on USB buses 154–159 are dynamically routed to particular USB ports based on states of registers 311.

In one embodiment of the invention, the register states are retained even when alternating current (AC) power is removed from the device, such as a PC. In one embodiment of the invention the switching of each port has a unique default state in an event when controlling registers 311 do not yet have information. In one embodiment of the invention, a software driver or software utility can be used to program the registers used by load balancing circuit 310. One should note that any number of processes and/or algorithms can be used to program registers 311 used by load balancing circuit 310. In another embodiment of the invention, the Basic Input/Output System (BIOS) of the PC or device system is used to program registers 311. A BIOS is the program which starts up a computer device and communicates between devices in the computer system (such as a hard drive and graphics card) and the operating system. BIOS is normally stored in an erasable programmable read only memory (EPROM) chip.

In one embodiment of the invention, a USB load balancing policy based on USB device classes is used to allow USB devices to maximize available USB bus bandwidth. Particular classes of USB devices tend to require the same amount of USB bus bandwidth. In one embodiment of the invention, classes of high bandwidth devices are paired with classes of low bandwidth devices to maximize each device's specific bandwidth requirement. The USB device descriptors are read to retrieve the specific class of the device. Based on the USB device classes, specific USB device classes are separated from being connected to USB root hubs with other specific classes.

For example, in one embodiment of the invention Mass Storage class devices (e.g., hard drives) are separated so they do not run on the same root hub. Other device classes, for example HID class, which uses minimal bandwidth, can be paired to run on the same root hub as a Mass Storage device class device. In another embodiment, classes of low bandwidth devices are allowed to be paired together.

Figure 6:
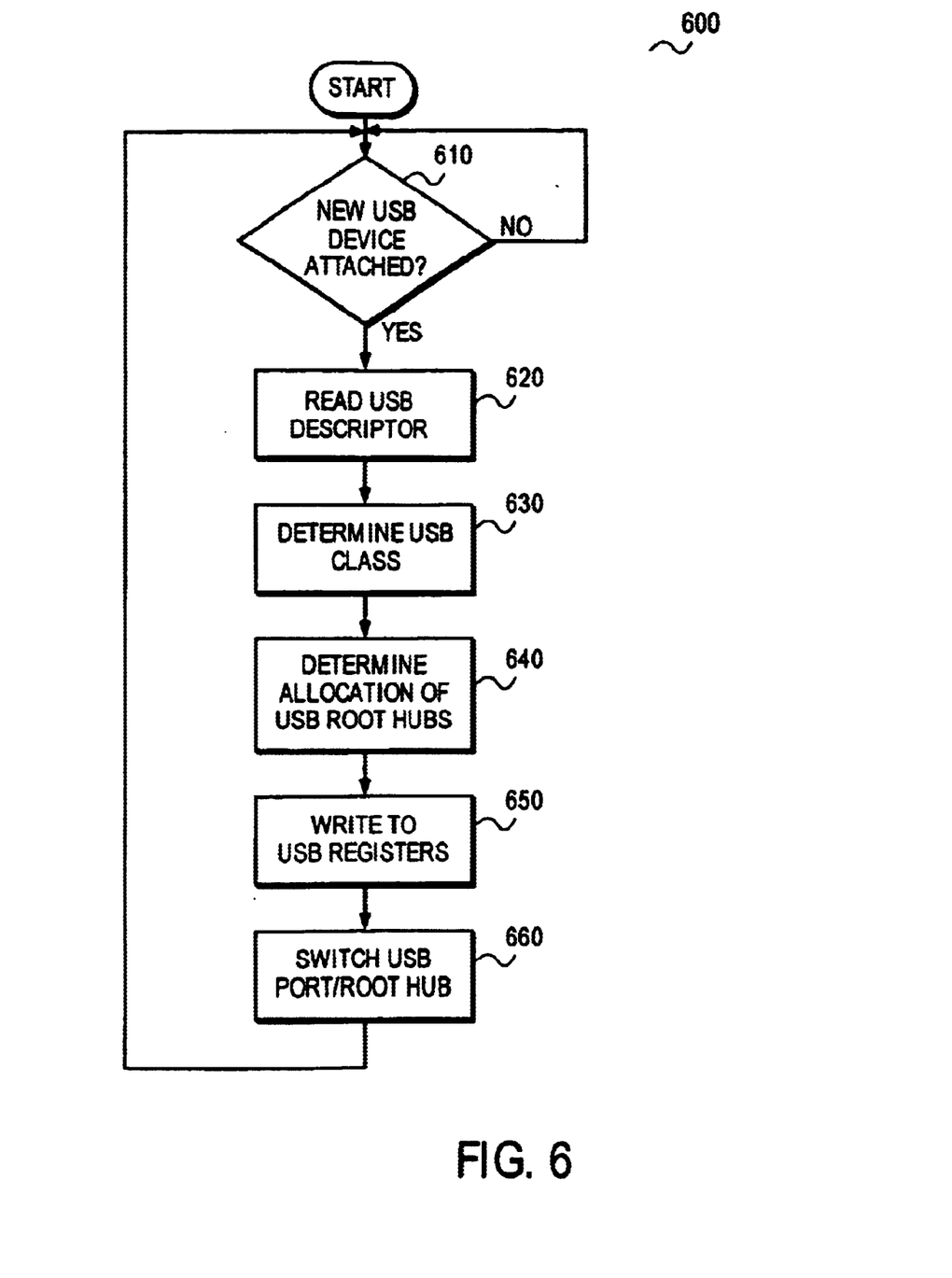
FIG. 6 illustrates a block diagram of a process of an embodiment of the invention for using a USB class based balancing policy.

FIG. 6 illustrates a block diagram of a process of an embodiment of the invention for using a USB class load balancing policy. Process 600 in FIG. 6 starts with block 610, which determines whether a new USB device is attached to a USB port. If a new USB device is attached to a USB port, than process 600 continues with block 620. If there are not new USB devices attached to a USB port (other than those already attached), then process 600 continues with block 610. Block 620 reads an attached device's USB descriptor from the USB bus. After the USB descriptor has been read, block 630 determines the USB class type from the read descriptor. Block 640 determines the allocation of USB root hubs based on the USB class type. Block 640 also keeps track of which USB devices are attached to which USB root hubs. For example, in one embodiment of the invention a table is kept with USB class type, USB root hub assigned and USB device.

In one embodiment, logic determines which USB devices are allowed to connect to the same USB root hub and which USB devices are not allowed to connect to the same USB hub. Then the available USB hub root hubs are allocated USB devices according to the allowable connections. After the allocation of USB devices is determined, block 650 writes information to registers 311 used by load balancing circuit 310. Registers 311 control switching of USB root hubs to available USB ports. After the switching occurs, process 600 determines if any additional USB devices have been attached to a USB port. In one embodiment of the invention process 600 dynamically switches USB devices between USB root hubs before the device is placed in use to avoid interrupting processes such as writing to a USB hard drive, writing to a CDRW, printing a document, etc.

In one embodiment of the invention, a use and bandwidth consumption based policy is used to allow USB devices to maximize available USB bus bandwidth. In one embodiment of the invention the use and bandwidth consumption based policy uses a background driver to monitor the amount of use and bandwidth consumption of each USB device connected to the system. Information gathered from the monitoring of the use and bandwidth consumption of each USB device connected to the system is then used to determine how each device should be connected to the various USB ports to optimize the available USB bandwidth.

For example, suppose a user has a USB hard drive, a USB scanner, a USB mouse and a USB printer connected to her PC at various input/output (I/O) ports. The background driver monitoring the use and bandwidth consumption of each device returns information that the USB scanner is not being used at the same time as the USB printer, that the USB mouse only requires minimum bandwidth, and the USB hard drive is frequently used. The USB ports are then balanced accordingly. Therefore, the USB hard drive is paired with the USB mouse on a particular USB root hub, and the USB scanner is paired with the USB printer on another USB root hub. Thus, the user does not have to determine before hand, or switch the devices randomly to maximize the available USB bandwidth per USB root hub.

In one embodiment, USB load balancing circuit 310 does not switch the USB port device allocations until USB devices have completed operations to prevent switching in the middle of USB device use. In another embodiment, the information retrieved from background monitoring is used upon the next system startup to prevent interruptions by switching devices that are currently in use.

Figure 7:
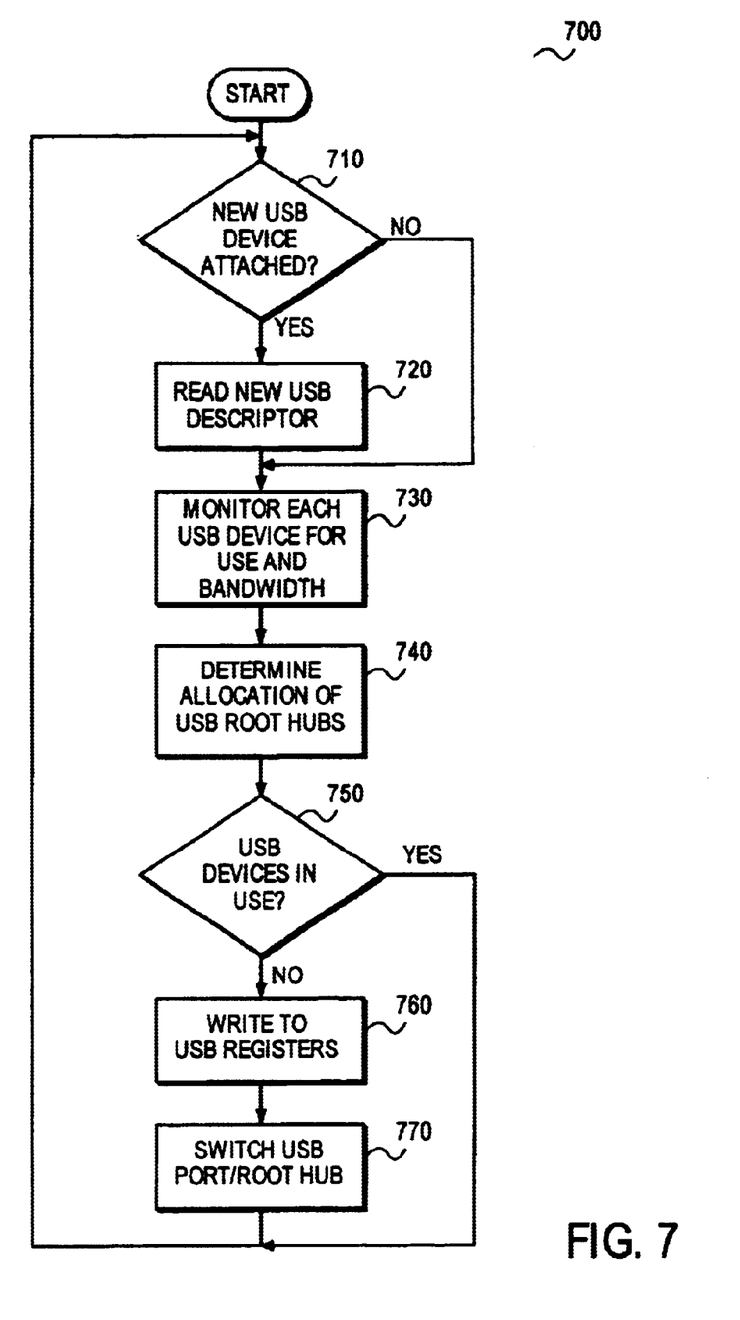
FIG. 7 illustrates a block diagram of a process of an embodiment of the invention using a USB use and bandwidth consumption based policy.

FIG. 7 illustrates a block diagram of a process of an embodiment of the invention for using a USB use and bandwidth consumption based policy. Process 700 in FIG. 7 starts with block 710, which determines whether a new USB device is attached to a USB port. If a new USB device is attached to a USB port, than process 700 continues with block 720. If there are not new USB devices attached to a USB port (other than those already attached), then process 700 continues with block 710. Block 720 reads an attached device's USB descriptor from the USB bus. After the USB descriptor has been read, block 730 monitors each USB device connected to a USB port for use and bandwidth consumption. Process 700 continues with block 740 determining allocation of USB root hubs based on use and USB bandwidth consumption.

In one embodiment of the invention block 740 keeps a table of which USB devices are used or not used with other USB devices, and how much of the available bandwidth each device uses. In one embodiment, block 740 keeps a running average of USB bandwidth consumption per each USB device. Block 740 makes use of bandwidth consumption and USB device usage information to allocate USB devices to available USB root hubs to maximize the available USB bus bandwidth for the attached USB devices.

In one embodiment of the invention process 700 continues with block 750, which determines whether the USB devices attached are currently in use. If the attached USB devices are currently in use, process 700 continues with block 710. If the USB devices that are to be reallocated are not in use, then process 700 continues with block 760. Block 760 writes information to registers 311 used by USB load balancing circuit 310. Process 700 then continues with block 770. Block 770 switches the USB ports to the allocated USB root hub based on device use and bandwidth consumption.

In one embodiment of the invention process 700 dynamically switches available USB ports when the USB devices to be switched are not currently being used. This is to prevent situations when interruption of a device would cause the loss of data or be inconvenient (e.g., printing documents, writing to hard drives, etc.). In another embodiment, process 700 writes the information to registers 311 used by USB load balancing circuit 310 to be used upon restart of the computer if the same devices are attached to USB ports.

With the use of USB load balancing circuit 310, and embodiments of the invention previously described, users of USB systems do not have to manually switch USB devices to maximize the available bandwidth associated with a USB root hub. Also, embodiments of the invention assists users that do not understand USB bandwidth availability or device consumption. Even if users do understand USB root hub bandwidths and device consumption, embodiments of the invention saves time and prevents user frustration by allocating USB devices/root hubs to maximize the available bandwidth to a plurality of USB devices. It should be noted that while examples may have mentioned USB 1.1 and USB 2.0, that the embodiments of the invention are applicable to future USB developments also.

The above embodiments can also be stored on a device or medium and read by a machine to perform instructions. The device or medium may include a solid state memory device and/or a rotating magnetic or optical disk. The device or medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A circuit comprising:
   a plurality of switches coupled to a plurality of registers, the plurality of registers to control the plurality of switches, and
   a universal serial bus (USB) host controller coupled to said plurality of switches, said USB host controller having a plurality of root hubs
   wherein the plurality of switches are dynamically switched to route pairs of a plurality of USB ports to one of said plurality of root hubs based on a USB device bandwidth balancing process to maximize USB device bandwidth.

2. The circuit of claim 1, wherein the USB device balancing process balances USB bandwidth load by pairing USB ports to a root hub based on USB device class.

3. The circuit of claim 2, wherein the USB device class is determined from a USB device descriptor.

4. The circuit of claim 1, wherein the USB device balancing process to balance USB bandwidth load by pairing USB ports to a root hub based on USB device usage information and bandwidth consumption information.

5. The circuit of claim 1, wherein a plurality of USB signals are routed through the plurality of switches to the plurality of USB ports dynamically.

6. The circuit of claim 1, wherein the USB device balancing process balances USB bandwidth load predetermining USB devices allowable to share a same root hub and connecting allowable USB devices to available root hubs.

7. A system comprising:
   a processor;
   a memory coupled to the processor;
   a north bridge coupled to a bus and the processor;
   a south bridge coupled to the bus, said south bridge including a universal serial bus (USB) host controller having a plurality of root hubs; and
   USB bandwidth load balancing circuit coupled to said south bridge,
   wherein the USB bandwidth load balancing circuit dynamically distributes pairs of a plurality of USB ports each to one of said plurality of root hubs based on a USB device bandwith balancing process to maximize USB device bandwith.

8. The system of claim 7, wherein the USB bandwidth load balancing circuit comprises:
   a plurality of switches coupled to a plurality of registers, the plurality of registers to control the plurality of switches, wherein the plurality of switches are coupled to a plurality of universal serial bus (USB) ports based on a USB device bandwidth balancing process.

9. The system of claim 8, wherein the USB device balancing process to balance USB bandwidth load by pairing USB ports to a root hub based on USB device class.

10. The system of claim 9, wherein the USB device class is determined from a USB device descriptor.

11. The system of claim 8, wherein the USB device balancing process to balance USB bandwidth load by pairing USB ports to a root hub based on USB device usage information and bandwidth consumption information.

12. The system of claim 8, wherein a plurality of USB signals are routed through the plurality of switches to the plurality of USB ports dynamically.

13. A method comprising:
   determining allocation of a plurality of USB root hubs; and
   switching a plurality of USB root hub USB device assignments dynamically to distribute pairs of a plurality of USB ports each to one of a plurality of USB root hubs based on a USB device bandwidth balancing process to maximize USB device bandwith.

14. The method of claim 13, further comprising:
   reading a USB descriptor for a USB device; and
   writing a plurality of USB root hub allocation information to a plurality of registers coupled to a USB bandwidth load balancing circuit.

15. The method of claim 14, wherein the USB bandwidth load balancing circuit comprises:
   a plurality of switches coupled to the plurality of registers, the plurality of registers to control the plurality of switches, wherein the plurality of switches are coupled to a plurality of USB ports based on a USB device bandwidth balancing process.

16. The method of claim 15, further comprising:
   determining an attached USB device's class;
   distinguishing USB device classes;
   allowing at least two low bandwidth USB class devices to couple to a same USB root hub;
   allowing at least one low bandwidth USB class device and at least one high bandwidth USB class device to couple to a same root hub; and
   preventing a first high bandwidth USB class device and a second high bandwidth USB class device to couple to a same USB root hub.

17. The method of claim 16, wherein USB device classes are determined from a USB device descriptor.

18. The method of claim 16, wherein switching the plurality of USB root hub USB device assignments is dynamic.

19. The method of claim 15, further comprising monitoring each of an attached USB device'use and USB bandwidth consumption, wherein the USB device balancing process to balance USB bandwidth load by the USB device's use information and bandwidth consumption information.

20. The method of claim 19, wherein switching USB root hub USB device assignments is dynamic.

21. A program storage device readable by a machine comprising instructions that cause the machine to:
   determine allocation of a plurality of USB root hubs; and
   switching a plurality of USB root hub USB device assignments dynamically to distribute pairs of a plurality of USB ports each to one of a plurality of USB root hubs based on a USB device bandwidth balancing process to maximize USB device bandwidth.

22. The program storage device of claim 21, further comprising instructions that cause the machine to:
   read a USB descriptor for a USB device; and
   write a plurality of USB root hub allocation information to a plurality of registers coupled to a USB bandwidth load balancing circuit.

23. The program storage device of claim 22, wherein the USB bandwidth load balancing circuit comprises:
   a plurality of switches coupled to the plurality of registers, the plurality of registers to control the plurality of switches, wherein the plurality of switches are coupled to a plurality of USB ports based on a USB device bandwidth balancing process.

24. The program storage device of claim 23, further comprising instructions that cause the machine to:
   determine an attached USB device's class;
   distinguish USB device classes;
   allow at least two low bandwidth USB class devices to couple to a same USB root hub;
   allow at least one low bandwidth USB class device and at least one high bandwidth USB class device to couple to a same root hub; and
   prevent a first high bandwidth USB class device and a second high bandwidth USB class device to couple to a same USB root hub.

25. The program storage device of claim 24, wherein USB device classes are determined from a USB device descriptor.

26. The program storage device of claim 24, wherein switching USB root hub USB device assignments is dynamic.

27. The program storage device of claim 23, further comprising instructions that cause the machine to:
   monitor each of an attached USB device's use and USB bandwidth consumption, wherein the USB device balancing process to balance USB bandwidth load by the USB device's use information and bandwidth consumption information.

28. The program storage device of claim 27, wherein switching the plurality of USB root hub USB device assignments is dynamic.

* * * * *

UNITED STATES PATENT AND TRADEMARK OFFICE
CERTIFICATE OF CORRECTION

PATENT NO. : 6,839,793 B2
DATED : January 4, 2005
INVENTOR(S) : Ragland

It is certified that error appears in the above-identified patent and that said Letters Patent is hereby corrected as shown below:

Column 2,
Line 60, delete "am" and insert -- an --.
Line 65, delete "circuits" and insert -- circuit --.

Column 3,
Line 26, delete "illustrates" and insert -- illustrated --.

Column 4,
Line 26, after "USB", delete "hub".
Line 36, after "use", insert -- so as --.

Signed and Sealed this

Tenth Day of May, 2005

JON W. DUDAS
*Director of the United States Patent and Trademark Office*